(12) United States Patent
Krause

(10) Patent No.: US 11,226,941 B2
(45) Date of Patent: Jan. 18, 2022

(54) AUTOMATED MANAGEMENT OF DATABASE SCHEMAS

(71) Applicant: SAP SE, Walldorf (DE)

(72) Inventor: Torsten Krause, Wiesloch (DE)

(73) Assignee: SAP SE, Walldorf (DE)

( * ) Notice: Subject to any disclaimer, the term of this patent is extended or adjusted under 35 U.S.C. 154(b) by 233 days.

(21) Appl. No.: 16/690,026

(22) Filed: Nov. 20, 2019

(65) Prior Publication Data

US 2021/0149853 A1 May 20, 2021

(51) Int. Cl.
   *G06F 16/21* (2019.01)
   *G06F 16/22* (2019.01)
   *G06F 11/30* (2006.01)
   *G06F 16/242* (2019.01)

(52) U.S. Cl.
   CPC ........ *G06F 16/213* (2019.01); *G06F 11/3082* (2013.01); *G06F 16/2282* (2019.01); *G06F 16/2423* (2019.01)

(58) Field of Classification Search
   CPC ............... G06F 16/213; G06F 16/2282; G06F 11/3082; G06F 16/2423
   See application file for complete search history.

(56) References Cited

U.S. PATENT DOCUMENTS

| | | | | |
|---|---|---|---|---|
| 6,026,408 A * | 2/2000 | Srinivasan | ............ | G06F 16/289 |
| 7,343,377 B1 * | 3/2008 | van Opdorp | ........ | G06F 16/2365 |
| 8,204,848 B2 * | 6/2012 | Sinha | ................ | G06F 16/217 |
| | | | | 707/600 |
| 9,195,691 B2 * | 11/2015 | Eker | ................ | G06F 16/2365 |
| 9,767,141 B2 * | 9/2017 | Eker | ................ | G06F 16/213 |
| 10,268,709 B1 * | 4/2019 | Suehs | ................ | G06F 16/211 |
| 10,664,467 B2 * | 5/2020 | Eker | ................ | G06F 16/2365 |
| 10,949,404 B2 * | 3/2021 | Suehs | ................ | G06F 16/211 |
| 2003/0172368 A1 * | 9/2003 | Alumbaugh | ............. | G06F 8/71 |
| | | | | 717/106 |
| 2005/0004951 A1 * | 1/2005 | Ciaramitaro | ............ | G06F 16/93 |
| 2005/0071359 A1 * | 3/2005 | Elandassery | .......... | G06F 16/213 |
| 2012/0173658 A1 * | 7/2012 | Tussing | ............. | H04L 67/2819 |
| | | | | 709/217 |
| 2013/0262399 A1 * | 10/2013 | Eker | ................ | G06F 16/2365 |
| | | | | 707/687 |
| 2014/0143284 A1 * | 5/2014 | McCaffrey | ............ | G06F 16/213 |
| | | | | 707/803 |
| 2015/0269193 A1 * | 9/2015 | King | ................ | G06F 40/221 |
| | | | | 707/694 |
| 2016/0140149 A1 * | 5/2016 | Lin | ...................... | G06F 16/213 |
| | | | | 707/803 |
| 2018/0329931 A1 * | 11/2018 | Baid | ........................ | G06F 8/60 |
| 2019/0243665 A1 * | 8/2019 | Bolik | ...................... | G06F 8/60 |

* cited by examiner

*Primary Examiner* — Jorge A Casanova
(74) *Attorney, Agent, or Firm* — Fountainhead Law Group P.C.

(57) ABSTRACT

Some embodiments provide a non-transitory machine-readable medium that stores a program. The program queries a set of databases to identify a first set of database schemas. Each database schema in the first set of database schemas is configured for a database in the set of databases. The program further queries an inventory data storage for a second set of database schemas. The program also compares the first set of database schemas and the second set of database schemas. Based on the comparison, the program further determines whether to deactivate database schemas in the set of databases.

17 Claims, 6 Drawing Sheets

AUTOMATED MANAGEMENT OF DATABASE SCHEMAS

BACKGROUND

In many software development environments, software developers as well as quality assurance engineers can use a number of different database schemas to develop and test software applications. Sometimes, errors that occur in a database schema during development or testing of software applications are not readily available to software developers and quality assurance engineers. For instance, any errors that may occur can be stored in an error log in a database schema. Similarly, if upgrades or migration operations are performed on a database schema, any errors that can occur during such operations are not readily available to software developers and quality assurance engineers as these errors can be logged and stored in the database schema.

SUMMARY

In some embodiments, a non-transitory machine-readable medium stores a program executable by at least one processing unit of a device. The program queries a set of databases to identify a first set of database schemas. Each database schema in the first set of database schemas is configured for a database in the set of databases. The program further queries an inventory data storage for a second set of database schemas. The program also compares the first set of database schemas and the second set of database schemas. Based on the comparison, the program further determines whether to deactivate database schemas in the set of databases.

In some embodiments, determining whether to deactivate database schemas in the set of databases may include, for each database schema in the first set of database schemas that is not included in the second set of database schemas, adding the database schema to the second set of database schemas stored in the inventory data storage and preventing access to the database schema. Querying the set of databases may include querying each database in the set of databases; for each database in the set of databases, generating a list of errors, each error in the list of errors associated with a database schema configured for the database; merging the lists of errors into a single list of errors; and using the single list of errors as the first set of database schemas.

In some embodiments, the program may further reactivate each database schema in the second set of database schemas that is not included in the first set of database schemas. The program may further receive a request to create a database schema in a database in the set of databases, wherein the request includes a data source for the database schema; in response to the request, create the database schemas in the database; and copy data from the data source into the database schema. Each database in the set of databases may include a set of tables. A database schema configured for a database in the set of databases may include a subset of the set of tables and specify the relationships among the subset of the set of tables. Each database schema in the first set of database schemas may have at least one error stored in a table included in the database schema.

In some embodiments, a method queries a set of databases to identify a first set of database schemas. Each database schema in the first set of database schemas is configured for a database in the set of databases. The method further queries an inventory data storage for a second set of database schemas. The method also compares the first set of database schemas and the second set of database schemas. Based on the comparison, the method further determines whether to deactivate database schemas in the set of databases.

In some embodiments, determining whether to deactivate database schemas in the set of databases may include, for each database schema in the first set of database schemas that is not included in the second set of database schemas, adding the database schema to the second set of database schemas stored in the inventory data storage and preventing access to the database schema. Querying the set of databases may include querying each database in the set of databases; for each database in the set of databases, generating a list of errors, each error in the list of errors associated with a database schema configured for the database; merging the lists of errors into a single list of errors; and using the single list of errors as the first set of database schemas.

In some embodiments, the method may further reactivate each database schema in the second set of database schemas that is not included in the first set of database schemas. The method may further receive a request to create a database schema in a database in the set of databases, wherein the request includes a data source for the database schema; in response to the request, create the database schemas in the database; and copy data from the data source into the database schema. Each database in the set of databases may include a set of tables. A database schema configured for a database in the set of databases may include a subset of the set of tables and specify the relationships among the subset of the set of tables. Each database schema in the first set of database schemas may have at least one error stored in a table included in the database schema.

In some embodiments, a system includes a set of processing units and a non-transitory machine-readable medium that stores instructions. The instructions cause at least one processing unit to query a set of databases to identify a first set of database schemas. Each database schema in the first set of database schemas is configured for a database in the set of databases. The instructions further cause the at least one processing unit to query an inventory data storage for a second set of database schemas. The instructions also cause the at least one processing unit to compare the first set of database schemas and the second set of database schemas. Based on the comparison, the instructions further cause the at least one processing unit to determine whether to deactivate database schemas in the set of databases.

In some embodiments, determining whether to deactivate database schemas in the set of databases may include, for each database schema in the first set of database schemas that is not included in the second set of database schemas, adding the database schema to the second set of database schemas stored in the inventory data storage and preventing access to the database schema. Querying the set of databases may include querying each database in the set of databases; for each database in the set of databases, generating a list of errors, each error in the list of errors associated with a database schema configured for the database; merging the lists of errors into a single list of errors; and using the single list of errors as the first set of database schemas.

In some embodiments, the instructions may further cause the at least one processing unit to reactivate each database schema in the second set of database schemas that is not included in the first set of database schemas. The instructions further cause the at least one processing unit to receive a request to create a database schema in a database in the set of databases, wherein the request includes a data source for the database schema; in response to the request, create the database schemas in the database; and copy data from the data source into the database schema. Each database in the set of databases may include a set of tables. A database schema configured for a database in the set of databases may include a subset of the set of tables and specifies the relationships among the subset of the set of tables.

The following detailed description and accompanying drawings provide a better understanding of the nature and advantages of the present invention.

DETAILED DESCRIPTION

Figure 1:
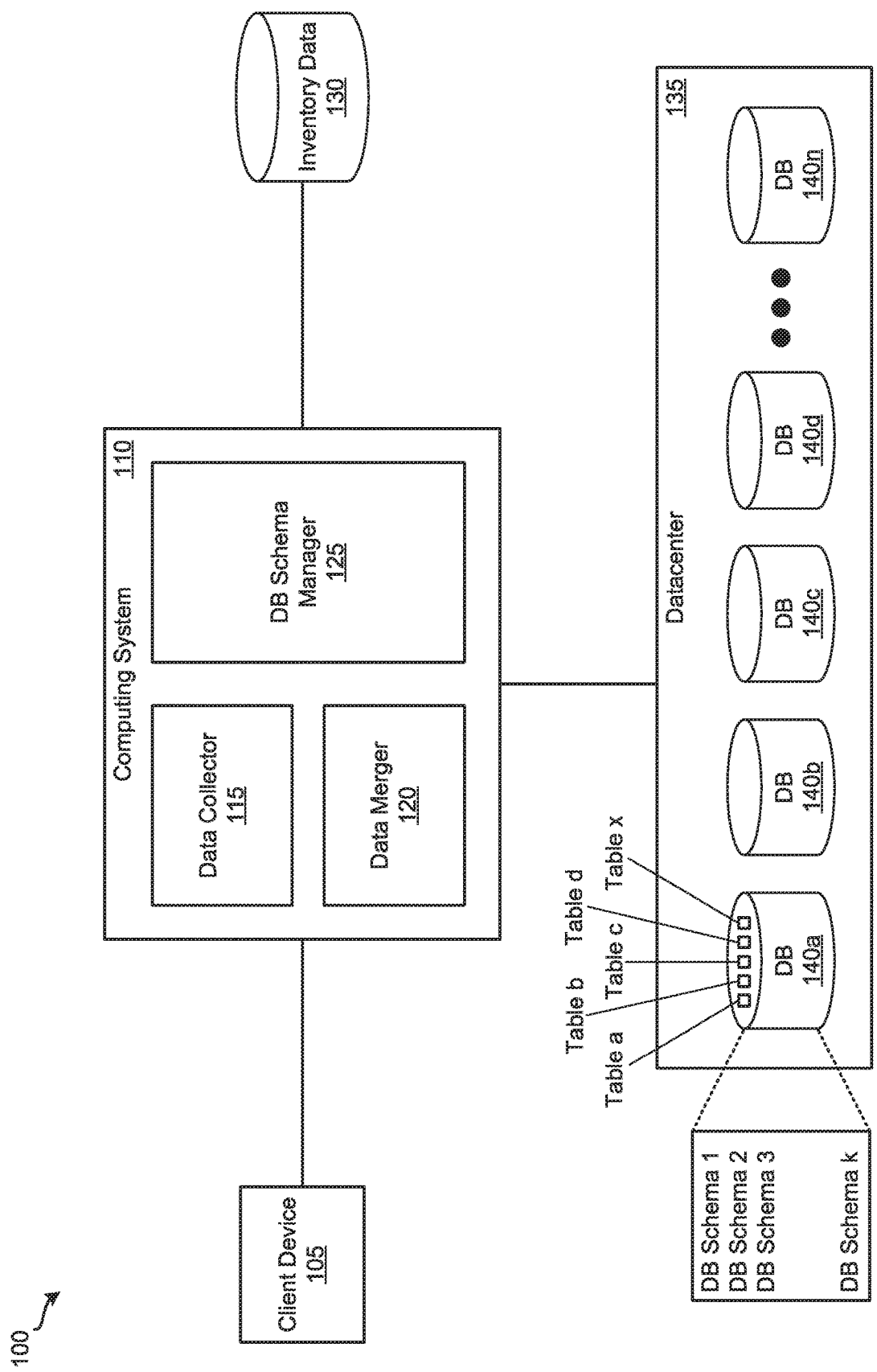
FIG. 1 illustrates a system for automatedly managing database schemas according to some embodiments.

In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Described herein are techniques for automatedly managing database schemas. In some embodiments, a computing system receives requests to create new database schemas in databases in a datacenter. To handle such a request, the computing system creates a new database schema in a database and then stores information associated with the newly created database instance in an inventory data storage. Periodically, the computing system queries the databases in the datacenter to identify database schemas that have errors associated with them. The computing system adds identified database schemas to a list in the inventory data storage of database schemas that have errors and that are not already in the list and then deactivates these database schemas. For database schemas in the list that are not included in the identified database schemas, the computing system reactivates the database schema. In some embodiments, the computing system deletes database schemas that have been deactivated for a defined amount of time.

The computing system may send an owner of a database schema a notification requesting confirmation that the database schema is still in use once a first defined amount of time has elapsed from the date the database schema was created. If the computing system does not receive a confirmation from the owner of the database schema, after a second defined amount of time has elapsed from the date of creation, the computing system deletes the database schema. If the computing system does receive a confirmation from the owner of the database schema, the computing system can request confirmation from the owner of the database schema after the first defined amount of time has elapsed from the date the computing system received the confirmation. The computing system can continually request confirmation from the owner of the database schema and check for confirmation from the owner.

The techniques described in the present application provide a number of benefits and advantages over conventional methods for managing database schemas. For instance, by automatedly monitoring database schemas and deleting database schemas that have been deactivated for a defined amount of time, unused or underutilized data in databases are reduced thereby improving performance of the database and usage of database resources. By automatedly monitoring database schemas, requesting confirmation from owners of database schemas that they are still in use, and deleting database schemas have not been confirmed after a defined amount of time, the same or similar benefits and advantages can be achieved.

FIG. 1 illustrates a system 100 for automatedly managing database schemas according to some embodiments. As shown, system 100 includes client device 105, computing system 110, inventor data storage 130, and datacenter 135. Inventor data storage 130 is configured to store information associated with database schemas configured for databases in datacenter 135. While FIG. 1 illustrates inventory data storage 130 as separate from computing system 110, one of ordinary skill in the art will appreciate that inventor data storage 130 can be part of computing system 110 in some embodiments.

Client device 105 is configured to communicate and interact with computing system 110. For example, a user of client device 105 may send DB schema manager 125 (via a graphical user interface (GUI) provided by DB schemed manager 125) requests to create database schemas for databases in datacenter 135. In response, the user of client device 105 may receive a notification once the database schema has been created and is ready to use. A user of client device 105 can receive a notification from computing system 110 indicating that a database schemas owned by the user has errors associated with it. In response, the user of the client device 105 may fix issues causing the errors. As another example, a user of client device 105 may receive a notification from computing system 110 requesting confirmation that a database schemas owned by the user is still in use. To continue using the database schema, the user can send computing system 110 a confirmation indicating that the database schema is still in use. Although FIG. 1 shows one client device, one of ordinary skill in the art will realize that system 100 can include additional client devices that are configured the same as or similar to client device 105.

As illustrated, computing system 110 includes data collector 115, data merger 120, and database (DB) schema manager 125. While FIG. 1 shows data collector 115, data merger 120, and database (DB) schema manager 125 implemented on a single computing system, one of ordinary skill in the art will understand that different components may be implemented on separate computing systems. For example, data collector 115 and data merger 120 can be implemented on one computing system while DB schema manager 125 can be implemented on another computing system. As another example, data collector 115, data merger 120, and database (DB) schema manager 125 may each be implemented on separate computing systems.

Data collector 115 is responsible for collecting data associated with database schemas configured for databases in datacenter 135. In some embodiments, data collector 115 includes a number of different database clients for interfacing with different types of databases 140 in datacenter 135. At a defined interval (e.g., once an hour, once a day, once a week, etc.), data collector 115 queries each database 140 in datacenter 135 using the appropriate database client. Specifically, data collector 115 queries a database 140 to identify a list of errors where each error in the list of errors is associated with a database schema configured for the database 140. In some embodiments, data collector 115 queries a database 140 to identify such an error by querying a table of the database schema that stores a log of errors that occurred during the operation of a database schema. Data collector 115 can store the errors from a query of a database 140 in a text file. Data collector 115 may send the text file to data merger 120.

Data merger 120 handles the merging of information. For instance, data merger 120 may receive from data collector 115 a text file for each query performed on a database 140 in datacenter 135. Once data merger 120 receives all the text files from data collector 115, data merger 120 generates a single text file that includes all the database schemas in datacenter 135 that have errors associated with it. After generating the single text file, data merger 120 sends it to DB schema manager 125.

DB schema manager 125 is configured to manage the provisioning of database schemas in datacenter 135. For example, DB schema manager 125 may receive from a user of client device 105 (e.g., via a GUI provided by DB schema manager 125) a request to create a database schema in a database 140. The request includes a data source for the database schema and an owner of the database schema (e.g., the user of client device 105). In response to such a request, DB schema manager 125 creates the database schema in the database 140 and copies data from the specified data source into the database schema. DB schema manager 125 also stores information associated with the database schema in a table in inventory data storage 130 (also referred to as a database schema table). In some embodiments, DB schema manager 125 performs the create and copy operations via application programming interfaces (APIs) provided by computing devices used to implement DBs 140a-n. Examples of information associated with a database schema can include the owner of the database schema, the data source of the database schema, the database 140 in which the database schema is created, the date the database schema is created, the status of the database schema, an expiration date of database schema, etc. The expiration date may be a defined amount of time (e.g., two weeks, one month, three months, six months, etc.) after the date the database scheme is created. The database schema table in inventory data storage 130 is used to store information associated with each and every database schema configured for databases 140 in datacenter 135. In some embodiments, DB schema manager 125 sets the status of the database schemas as active upon creating it. After creating the database schema, it can be deployed (i.e., provisioned) for use and the owner of the database schema can access it. As part of the deployment of a database schema, upgrade and/or migration operations may be performed on the database schema.

DB schema manager 125 also handles the deprovisioning (i.e., deactivation) of database schemas. For instance, when DB schema manager 125 receives from data merger 120 a list of errors, DB schema manager 125 queries the database schema table in inventory data storage 130 for every database schema that has an active status. Next, DB schema manager 125 performs a first join operation between the database schemas having an active status and the list of errors to determine a list of individual errors that are each associated with a database schema having an active status. DB schema manager 125 adds each error in the list of individual errors to another table in inventory data storage 130 (also referred to as an error table). The error table in inventory data storage 130 is used to store information associated with errors that have occurred to database schemas in databases 140 in datacenter 135. Examples of such information associated with an error include a name of the error, information associated with the error (e.g., a date on which the error occurred, etc.), a name of the database schema associated with the error, information associated with the database schema (e.g., the owner of the database schema, the date the database schema was created, etc.), etc. In some embodiments, DB schema manager 125 does not add errors to the error table in inventory data storage 130 that are duplicates.

DB schema manager 125 then performs a second join operation between the database schemas having an active status and the list of errors to determine a list of unique database schemas that each has at least one error associated with it. For each unique database schema in the list of unique database schemas, DB schema manager 125 sends the owner of the database schema a notification indicating that the database schema has been deactivated along with a list of the errors associated with the database schema that were added to the error table, sets the status of the database schema in the database schema table in inventory data storage 130 to an inactive status, and then deactivates the database schema (e.g., prevents access to the database schema).

DB schema manager 125 also monitors active database schemas and processes them differently based on different conditions. For example, DB schema manager 125 may receive from an owner of an active database schema (e.g., a user of client device 105) a confirmation that the database schema is still in use. In response to receiving the confirmation, DB schema manager 125 updates the expiration date of the database schema in the database schema table stored in inventory data storage 130 by a defined amount of time (e.g., two weeks, one month, three months, six months, etc.) after the time at which DB schema manager 125 received the confirmation. In some embodiments, DB schema manager 125 periodically iterates through the active database schemas to check whether the expiration date of the database schema has elapsed. If so, DB schema manager 125 deletes the database schema from the database 140 for which the database schema is configured and deletes the record of the database schema from the database schema table in inventory data storage 130.

In addition, DB schema manager 125 monitors deactivated database schemas and processes them differently based on different conditions. For instance, whenever DB schema manager 125 receives from data merger 120 a list of errors, DB schema manager 125 queries the database schema table stored in inventory data storage 130 for deactivated database schemas with an error date (i.e., the date on which the error occurred) that falls within a define range of time (e.g., seven to ten days, ten to fifteen days, twenty-one to twenty-eight days, etc.). Next, DB schema manager 125 compares the list of errors and the deactivated database schemas with an error date that falls within the define range of time. If an error in the list of errors has a matching error and a matching deactivated database schema, DB schema manager 125 sends the owner of the deactivated database schema a notification reminding the owner to fix the error. For every deactivated database schema in the query result that does not have a matching error in the list of errors, DB schema manager 125 reactivates the database schema.

Additionally, whenever DB schema manager 125 receives from data merger 120 a list of errors, DB schema manager 125 queries the database schema table stored in inventory data storage 130 for deactivated database schemas with an error date (i.e., the date on which the error occurred) that falls after the define range of time. DB schema manager 125 compares the list of errors and the deactivated database schemas with an error date that falls after the define range of time. If an error in the list of errors has a matching error and a matching deactivated database schema, DB schema manager 125 deletes the deactivated database schema from the database 140 for which the database scheme is configured and then sends the owner of the deleted database schema a notification indicating that the database schema has been deleted. In some embodiments, DB schema manager 125 performs the delete operation via APIs provided by computing devices used to implement DBs 140a-n. For every deactivated database schema in the query result that does not have a matching error in the list of errors, DB schema manager 125 reactivates the database schema.

As shown in FIG. 1, datacenter 135 includes database (DB) 140a-n. DBs 140a-n can be implemented on a set of computing devices in datacenter 135. In some embodiments, a DB 140 may be implemented as a database cluster. Each DB 140 is configured to store a set of tables. As an example, DB 140a is illustrated as including a set of tables a-x. Also, each DB 140 may include a set of database schemas that are configured for the DB 140. In some embodiments, a database schema configured for a DB 140 includes a subset of the set of tables in the DB 140 and specifies the relationships among the subset of the set of tables. A database schema can include additional elements such as views, sequences, indexes, procedures, functions, packages, etc. As an example, DB 140a is illustrated as including database schemas 1-k. As such, each of the database schemas 1-k includes a subset of the set of tables a-x.

Figure 2:
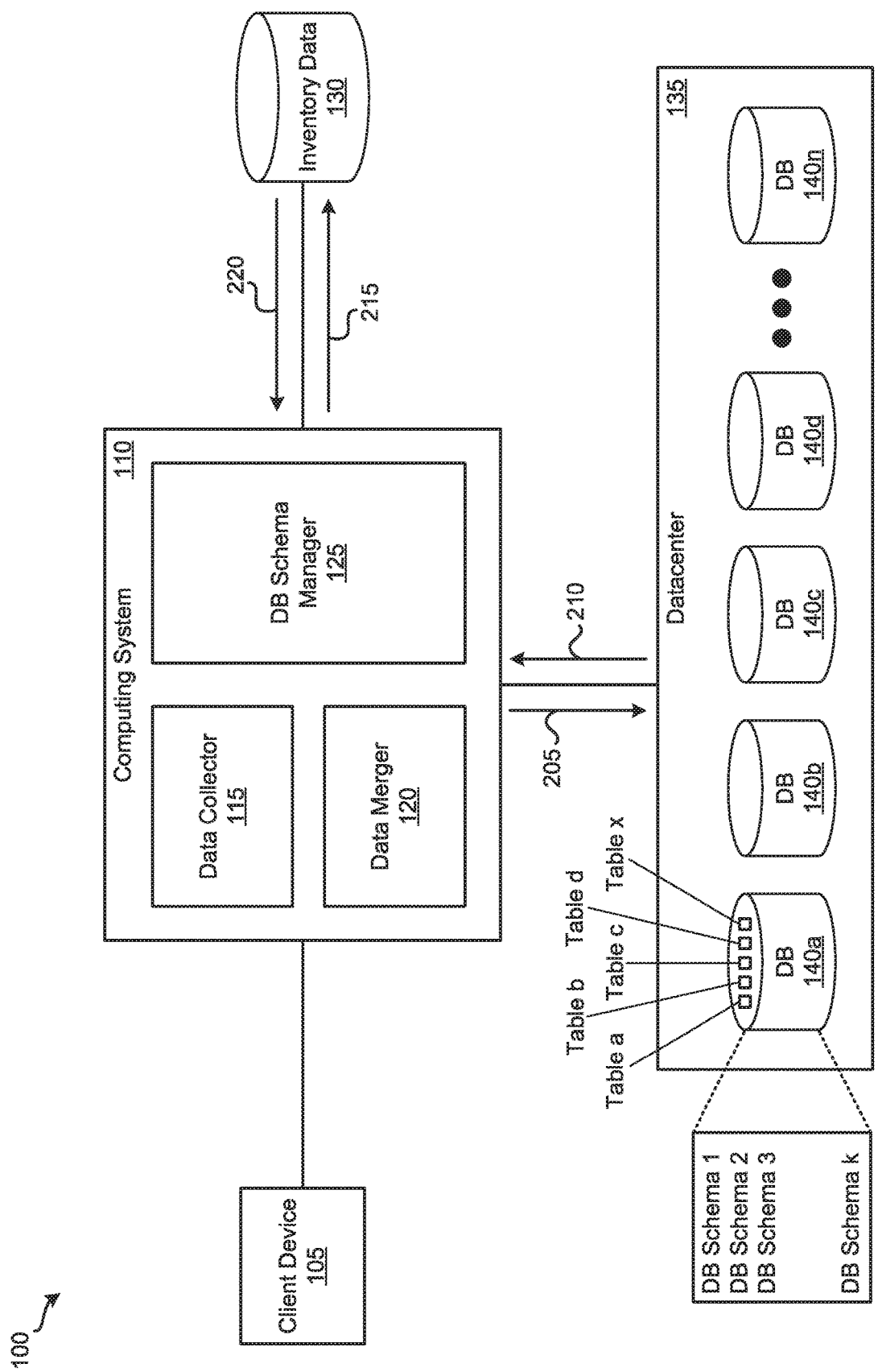
FIG. 2 illustrates an example data flow through the system illustrated in FIG. 1 according to some embodiments.

FIG. 2 illustrates an example data flow through system 100 according to some embodiments. For this example data flow an error associated with a database schema indicates that execution of a script on the database schema failed. Information stored about such an error in the text file may include a name of the script, information associated with the script (e.g., a file path of the script, a release version of the script, a date on which the script failed, etc.), a name of the database schema, information associated with the database schema (e.g., the owner of the database schema, the date the database schema was created, etc.), etc.

The data flow begins by data collector 115 querying, at 205 each DB 140 in datacenter 135 using an appropriate database client. In particular, data collector 115 queries each DB 140 to identify database schemas having errors associated with them by querying a table of each database schema that stores a log of errors that occurred during the operation of the database schema. In this example, the errors include failures that occurred during the execution of scripts on the database schema. Upon receiving, at 210, results of a query on a DB 140, data collector 115 stores the results of the query in a text file and sends it to data merger 120.

Upon receiving all the text files storing the results from the queries on DBs 140a-n, data merger 120 generates a single text file that includes all the errors that occurred on database schemas in datacenter 135. Next, data merger 120 sends the single text file to DB schema manager 125. When DB schema manager 125 receives the single text file of the list of errors, DB schema manager 125 queries, at 215, the database schema table in inventory data storage 130 for every database schema that has an active status. Once DB schema manager 125 receives, at 220, the results of the query, DB schema manager 125 performs a first join operation between the database schemas having an active status and the list of errors to determine a list of individual errors that are each associated with a database schema having an active status. DB schema manager 125 adds each error in the list of individual errors to the error table in inventory data storage 130. As mentioned above, in some embodiments, DB schema manager 125 does not add errors to the error table in inventory data storage 130 that are duplicates. For this example, DB schema manager 125 does not add a script having the same name, information associated with the script, a name of the database schema, information associated with the database schema, etc., as a script already stored in the error table since that is a duplicate error.

After DB schema manager 125 receives, at 220, the results of the query, DB schema manager 125 also performs a second join operation between the database schemas having an active status and the list of errors to determine a list of unique database schemas that each has at least one error associated with it. For each unique database schema in the list of unique database schemas, DB schema manager 125 sends the owner of the database schema a notification indicating that the database schema has been deactivated along with a list of the errors associated with the database schema, sets the status of the database schema in the database schema table in inventory data storage 130 to an inactive status, and then deactivates the database schema.

Next, DB schema manager 125 queries the database schema table stored in inventory data storage 130 for deactivated database schemas with an error date (i.e., the date on which the error occurred) that falls within a define range of time. DB schema manager 125 then compares the list of errors and the deactivated database schemas with an error date that falls within the define range of time. If an error in the list of errors has a matching error and a matching deactivated database schema, DB schema manager 125 sends the owner of the deactivated database schema a notification reminding the owner to fix the error. For every deactivated database schema in the query result that does not have a matching error in the list of errors, DB schema manager 125 reactivates the database schema.

Then, DB schema manager 125 queries the database schema table stored in inventory data storage 130 for deactivated database schemas with an error date (i.e., the date on which the error occurred) that falls after the define range of time. DB schema manager 125 compares the list of errors and the deactivated database schemas with an error date that falls after the define range of time. If an error in the list of errors has a matching error and a matching deactivated database schema, DB schema manager 125 deletes the deactivated database schema from the database 140 for which the database scheme is configured and then sends the owner of the deleted database schema a notification indicating that the database schema has been deleted. In some embodiments, DB schema manager 125 performs the delete operation via APIs provided by computing devices used to implement DBs 140a-n. For every deactivated database schema in the query result that does not have a matching error in the list of errors, DB schema manager 125 reactivates the database schema.

Figure 3:
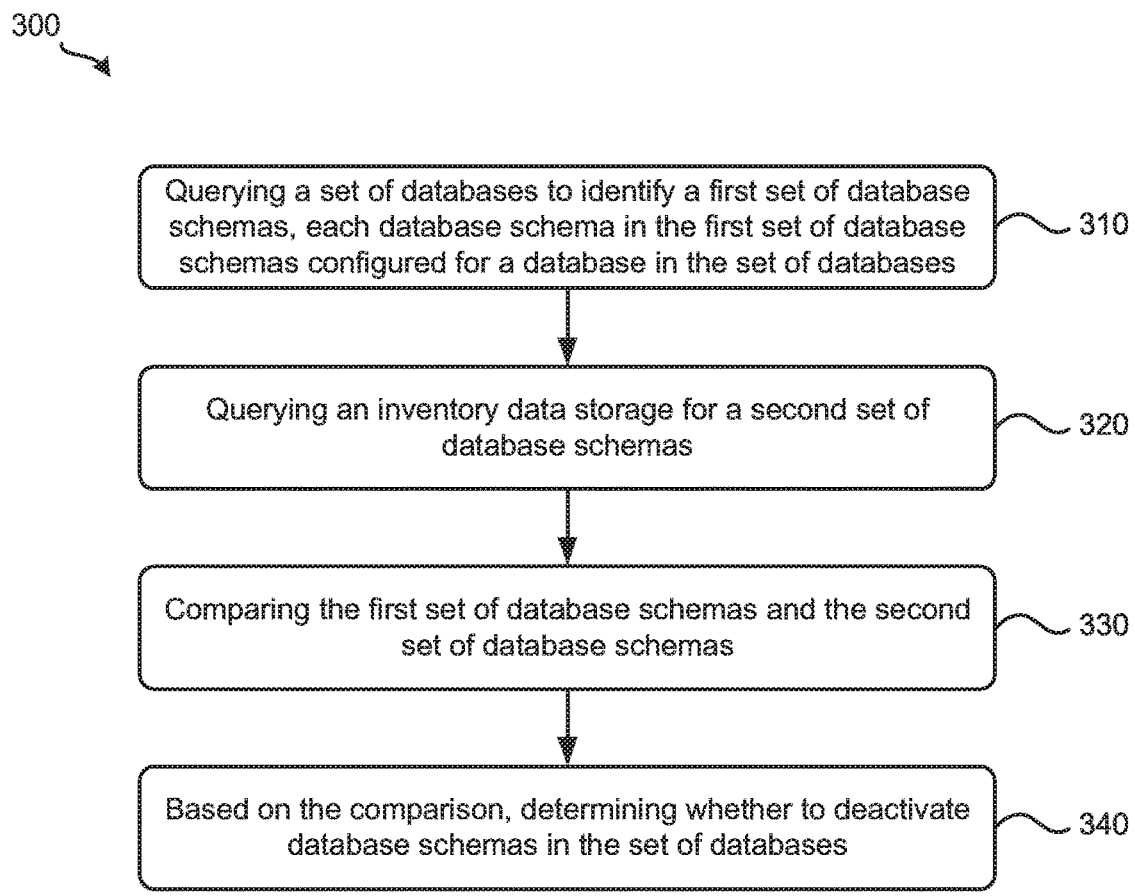
FIG. 3 illustrates a process for automatedly managing database schemas according to some embodiments.

FIG. 3 illustrates a process 300 for automatedly managing database schemas according to some embodiments. In some embodiments, computing system 110 performs process 300. Process 300 starts by querying, at 310, a set of databases to identify a first set of database schemas. Each database schema in the first set of database schemas is configured for a database in the set of databases. Referring to FIG. 1 as an example, data collector 115 may query DBs 140a-n to identify errors associated with database schemas configured for DBs 140a-n. The database schemas with which the identified errors are associated can be the first set of database schemas.

Next, process 300 queries, at 320, an inventory data storage for a second set of database schemas. Referring to FIG. 1 as an example, DB schema manager 125 can query the database schema table stored in inventory data storage 130 to identify every database schema that has an active status. Then process 300 compares, at 330, the first set of database schemas and the second set of database schemas. Finally, based on the comparison, process 300 determines, at 340, whether to deactivate database schemas in the set of databases. As an example, for each database schema in the first set of database schemas that is not included in the second set of database schemas, process 300 deactivates the database schema.

Figure 4:
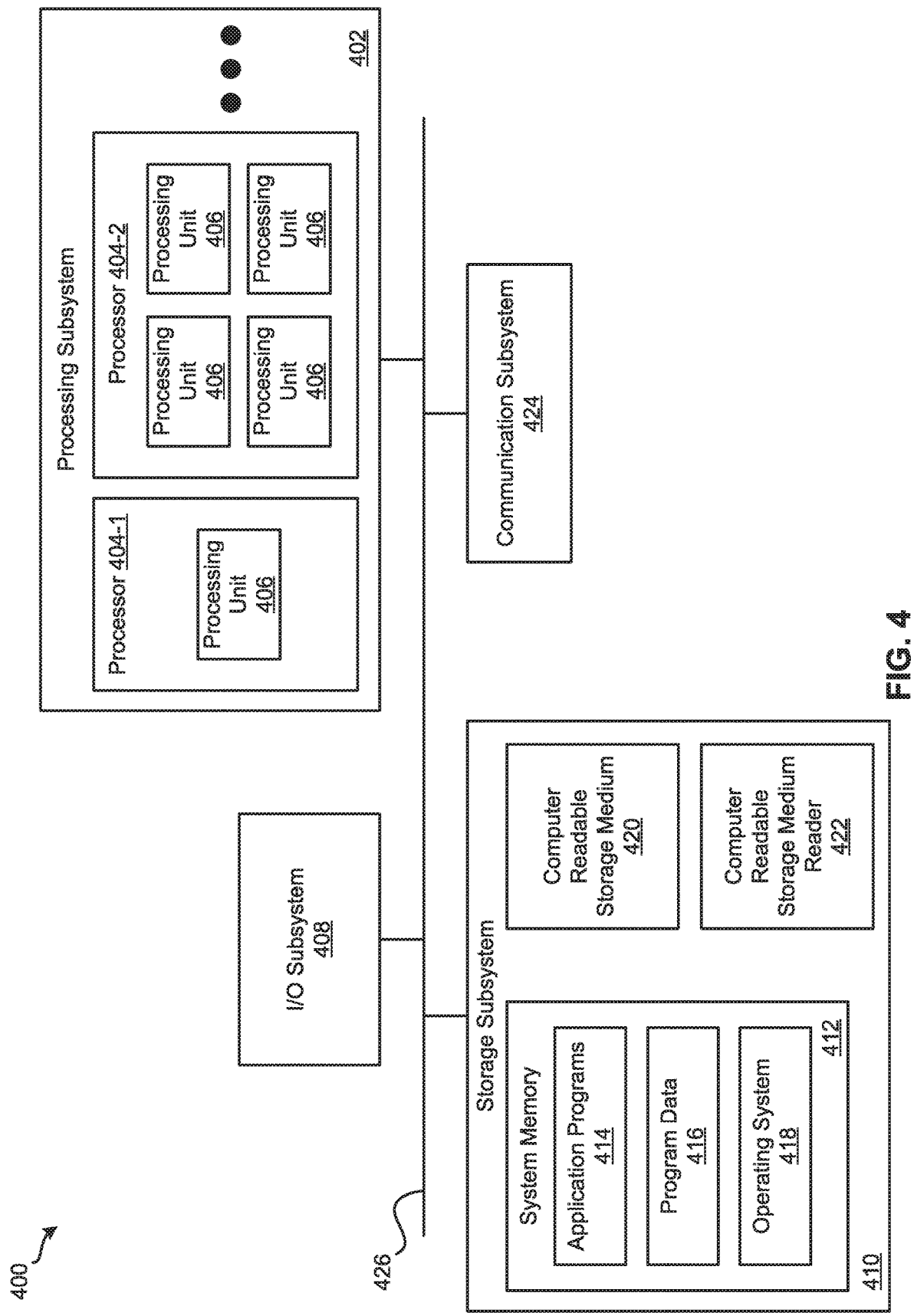
FIG. 4 illustrates an exemplary computer system, in which various embodiments may be implemented.

FIG. 4 illustrates an exemplary computer system 400 for implementing various embodiments described above. For example, computer system 400 may be used to implement client device 105, computing system 110, and computing systems used for implementing DBs 140a-n. Computer system 400 may be a desktop computer, a laptop, a server computer, or any other type of computer system or combination thereof. Some or all elements of data collector 115, data merger 120, DB schema manager 125, or combinations thereof can be included or implemented in computer system 400. In addition, computer system 400 can implement many of the operations, methods, and/or processes described above (e.g., process 300). As shown in FIG. 4, computer system 400 includes processing subsystem 402, which communicates, via bus subsystem 426, with input/output (I/O) subsystem 408, storage subsystem 410 and communication subsystem 424.

Bus subsystem 426 is configured to facilitate communication among the various components and subsystems of computer system 400. While bus subsystem 426 is illustrated in FIG. 4 as a single bus, one of ordinary skill in the art will understand that bus subsystem 426 may be implemented as multiple buses. Bus subsystem 426 may be any of several types of bus structures (e.g., a memory bus or memory controller, a peripheral bus, a local bus, etc.) using any of a variety of bus architectures. Examples of bus architectures may include an Industry Standard Architecture (ISA) bus, a Micro Channel Architecture (MCA) bus, an Enhanced ISA (EISA) bus, a Video Electronics Standards Association (VESA) local bus, a Peripheral Component Interconnect (PCI) bus, a Universal Serial Bus (USB), etc.

Processing subsystem 402, which can be implemented as one or more integrated circuits (e.g., a conventional microprocessor or microcontroller), controls the operation of computer system 400. Processing subsystem 402 may include one or more processors 404. Each processor 404 may include one processing unit 406 (e.g., a single core processor such as processor 404-1) or several processing units 406 (e.g., a multicore processor such as processor 404-2). In some embodiments, processors 404 of processing subsystem 402 may be implemented as independent processors while, in other embodiments, processors 404 of processing subsystem 402 may be implemented as multiple processors integrate into a single chip or multiple chips. Still, in some embodiments, processors 404 of processing subsystem 402 may be implemented as a combination of independent processors and multiple processors integrated into a single chip or multiple chips.

In some embodiments, processing subsystem 402 can execute a variety of programs or processes in response to program code and can maintain multiple concurrently executing programs or processes. At any given time, some or all of the program code to be executed can reside in processing subsystem 402 and/or in storage subsystem 410. Through suitable programming, processing subsystem 402 can provide various functionalities, such as the functionalities described above by reference to process 300, etc.

I/O subsystem 408 may include any number of user interface input devices and/or user interface output devices. User interface input devices may include a keyboard, pointing devices (e.g., a mouse, a trackball, etc.), a touchpad, a touch screen incorporated into a display, a scroll wheel, a click wheel, a dial, a button, a switch, a keypad, audio input devices with voice recognition systems, microphones, image/video capture devices (e.g., webcams, image scanners, barcode readers, etc.), motion sensing devices, gesture recognition devices, eye gesture (e.g., blinking) recognition devices, biometric input devices, and/or any other types of input devices.

User interface output devices may include visual output devices (e.g., a display subsystem, indicator lights, etc.), audio output devices (e.g., speakers, headphones, etc.), etc. Examples of a display subsystem may include a cathode ray tube (CRT), a flat-panel device (e.g., a liquid crystal display (LCD), a plasma display, etc.), a projection device, a touch screen, and/or any other types of devices and mechanisms for outputting information from computer system 400 to a user or another device (e.g., a printer).

As illustrated in FIG. 4, storage subsystem 410 includes system memory 412, computer-readable storage medium 420, and computer-readable storage medium reader 422. System memory 412 may be configured to store software in the form of program instructions that are loadable and executable by processing subsystem 402 as well as data generated during the execution of program instructions. In some embodiments, system memory 412 may include volatile memory (e.g., random access memory (RAM)) and/or non-volatile memory (e.g., read-only memory (ROM), programmable read-only memory (PROM), erasable programmable read-only memory (EPROM), electrically erasable programmable read-only memory (EEPROM), flash memory, etc.). System memory 412 may include different types of memory, such as static random access memory (SRAM) and/or dynamic random access memory (DRAM). System memory 412 may include a basic input/output system (BIOS), in some embodiments, that is configured to store basic routines to facilitate transferring information between elements within computer system 400 (e.g., during start-up). Such a BIOS may be stored in ROM (e.g., a ROM chip), flash memory, or any other type of memory that may be configured to store the BIOS.

As shown in FIG. 4, system memory 412 includes application programs 414, program data 416, and operating system (OS) 418. OS 418 may be one of various versions of Microsoft Windows, Apple Mac OS, Apple OS X, Apple macOS, and/or Linux operating systems, a variety of commercially-available UNIX or UNIX-like operating systems (including without limitation the variety of GNU/Linux operating systems, the Google Chrome® OS, and the like) and/or mobile operating systems such as Apple iOS, Windows Phone, Windows Mobile, Android, BlackBerry OS, Blackberry 10, and Palm OS, WebOS operating systems.

Computer-readable storage medium 420 may be a non-transitory computer-readable medium configured to store software (e.g., programs, code modules, data constructs, instructions, etc.). Many of the components (e.g., data collector 115, data merger 120, and DB schema manager 125) and/or processes (e.g., process 300) described above may be implemented as software that when executed by a processor or processing unit (e.g., a processor or processing unit of processing subsystem 402) performs the operations of such components and/or processes. Storage subsystem 410 may also store data used for, or generated during, the execution of the software.

Storage subsystem 410 may also include computer-readable storage medium reader 422 that is configured to communicate with computer-readable storage medium 420. Together and, optionally, in combination with system memory 412, computer-readable storage medium 420 may comprehensively represent remote, local, fixed, and/or removable storage devices plus storage media for temporarily and/or more permanently containing, storing, transmitting, and retrieving computer-readable information.

Computer-readable storage medium 420 may be any appropriate media known or used in the art, including storage media such as volatile, non-volatile, removable, non-removable media implemented in any method or technology for storage and/or transmission of information. Examples of such storage media includes RAM, ROM, EEPROM, flash memory or other memory technology, compact disc read-only memory (CD-ROM), digital versatile disk (DVD), Blu-ray Disc (BD), magnetic cassettes, magnetic tape, magnetic disk storage (e.g., hard disk drives), Zip drives, solid-state drives (SSD), flash memory card (e.g., secure digital (SD) cards, CompactFlash cards, etc.), USB flash drives, or any other type of computer-readable storage media or device.

Communication subsystem 424 serves as an interface for receiving data from, and transmitting data to, other devices, computer systems, and networks. For example, communication subsystem 424 may allow computer system 400 to connect to one or more devices via a network (e.g., a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.). Communication subsystem 424 can include any number of different communication components. Examples of such components may include radio frequency (RF) transceiver components for accessing wireless voice and/or data networks (e.g., using cellular technologies such as 2G, 3G, 4G, 5G, etc., wireless data technologies such as Wi-Fi, Bluetooth, ZigBee, etc., or any combination thereof), global positioning system (GPS) receiver components, and/ or other components. In some embodiments, communication subsystem 424 may provide components configured for wired communication (e.g., Ethernet) in addition to or instead of components configured for wireless communication.

One of ordinary skill in the art will realize that the architecture shown in FIG. 4 is only an example architecture of computer system 400, and that computer system 400 may have additional or fewer components than shown, or a different configuration of components. The various components shown in FIG. 4 may be implemented in hardware, software, firmware or any combination thereof, including one or more signal processing and/or application specific integrated circuits.

Figure 5:
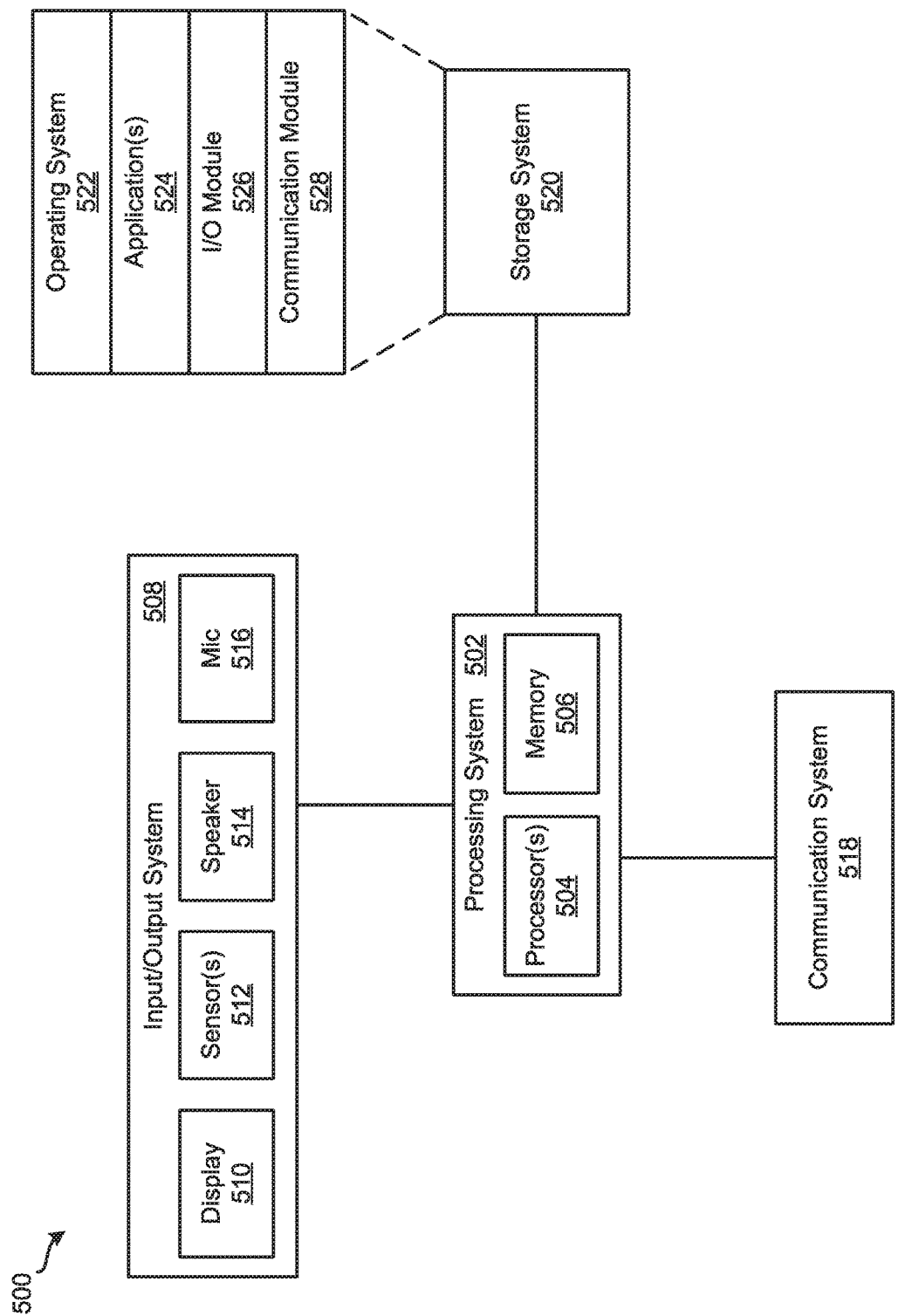
FIG. 5 illustrates an exemplary computing device, in which various embodiments may be implemented.

FIG. 5 illustrates an exemplary computing device 500 for implementing various embodiments described above. For example, computing device 500 may be used to implement client device 105. Computing device 500 may be a cellphone, a smartphone, a wearable device, an activity tracker or manager, a tablet, a personal digital assistant (PDA), a media player, or any other type of mobile computing device or combination thereof. As shown in FIG. 5, computing device 500 includes processing system 502, input/output (I/O) system 508, communication system 518, and storage system 520. These components may be coupled by one or more communication buses or signal lines.

Processing system 502, which can be implemented as one or more integrated circuits (e.g., a conventional microprocessor or microcontroller), controls the operation of computing device 500. As shown, processing system 502 includes one or more processors 504 and memory 506. Processors 504 are configured to run or execute various software and/or sets of instructions stored in memory 506 to perform various functions for computing device 500 and to process data.

Each processor of processors 504 may include one processing unit (e.g., a single core processor) or several processing units (e.g., a multicore processor). In some embodiments, processors 504 of processing system 502 may be implemented as independent processors while, in other embodiments, processors 504 of processing system 502 may be implemented as multiple processors integrate into a single chip. Still, in some embodiments, processors 504 of processing system 502 may be implemented as a combination of independent processors and multiple processors integrated into a single chip.

Memory 506 may be configured to receive and store software (e.g., operating system 522, applications 524, I/O module 526, communication module 528, etc. from storage system 520) in the form of program instructions that are loadable and executable by processors 504 as well as data generated during the execution of program instructions. In some embodiments, memory 506 may include volatile memory (e.g., random access memory (RAM)), non-volatile memory (e.g., read-only memory (ROM), programmable read-only memory (PROM), erasable programmable read-only memory (EPROM), electrically erasable programmable read-only memory (EEPROM), flash memory, etc.), or a combination thereof.

I/O system 508 is responsible for receiving input through various components and providing output through various components. As shown for this example, I/O system 508 includes display 510, one or more sensors 512, speaker 514, and microphone 516. Display 510 is configured to output visual information (e.g., a graphical user interface (GUI) generated and/or rendered by processors 504). In some embodiments, display 510 is a touch screen that is configured to also receive touch-based input. Display 510 may be implemented using liquid crystal display (LCD) technology, light-emitting diode (LED) technology, organic LED (OLED) technology, organic electro luminescence (OEL) technology, or any other type of display technologies. Sensors 512 may include any number of different types of sensors for measuring a physical quantity (e.g., temperature, force, pressure, acceleration, orientation, light, radiation, etc.). Speaker 514 is configured to output audio information and microphone 516 is configured to receive audio input. One of ordinary skill in the art will appreciate that I/O system 508 may include any number of additional, fewer, and/or different components. For instance, I/O system 508 may include a keypad or keyboard for receiving input, a port for transmitting data, receiving data and/or power, and/or communicating with another device or component, an image capture component for capturing photos and/or videos, etc.

Communication system 518 serves as an interface for receiving data from, and transmitting data to, other devices, computer systems, and networks. For example, communication system 518 may allow computing device 500 to connect to one or more devices via a network (e.g., a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.). Communication system 518 can include any number of different communication components. Examples of such components may include radio frequency (RF) transceiver components for accessing wireless voice and/or data networks (e.g., using cellular technologies such as 2G, 3G, 4G, 5G, etc., wireless data technologies such as Wi-Fi, Bluetooth, ZigBee, etc., or any combination thereof), global positioning system (GPS) receiver components, and/or other components. In some embodiments, communication system 518 may provide components configured for wired communication (e.g., Ethernet) in addition to or instead of components configured for wireless communication.

Storage system 520 handles the storage and management of data for computing device 500. Storage system 520 may be implemented by one or more non-transitory machine-readable mediums that are configured to store software (e.g., programs, code modules, data constructs, instructions, etc.) and store data used for, or generated during, the execution of the software.

In this example, storage system 520 includes operating system 522, one or more applications 524, I/O module 526, and communication module 528. Operating system 522 includes various procedures, sets of instructions, software components and/or drivers for controlling and managing general system tasks (e.g., memory management, storage device control, power management, etc.) and facilitates communication between various hardware and software components. Operating system 522 may be one of various versions of Microsoft Windows, Apple Mac OS, Apple OS X, Apple macOS, and/or Linux operating systems, a variety of commercially-available UNIX or UNIX-like operating systems (including without limitation the variety of GNU/Linux operating systems, the Google Chrome® OS, and the like) and/or mobile operating systems such as Apple iOS, Windows Phone, Windows Mobile, Android, BlackBerry OS, Blackberry 10, and Palm OS, WebOS operating systems.

Applications 524 can include any number of different applications installed on computing device 500. Examples of such applications may include a browser application, an address book application, a contact list application, an email application, an instant messaging application, a word processing application, JAVA-enabled applications, an encryption application, a digital rights management application, a voice recognition application, location determination application, a mapping application, a music player application, etc.

I/O module 526 manages information received via input components (e.g., display 510, sensors 512, and microphone 516) and information to be outputted via output components (e.g., display 510 and speaker 514). Communication module 528 facilitates communication with other devices via communication system 518 and includes various software components for handling data received from communication system 518.

One of ordinary skill in the art will realize that the architecture shown in FIG. 5 is only an example architecture of computing device 500, and that computing device 500 may have additional or fewer components than shown, or a different configuration of components. The various components shown in FIG. 5 may be implemented in hardware, software, firmware or any combination thereof, including one or more signal processing and/or application specific integrated circuits.

Figure 6:
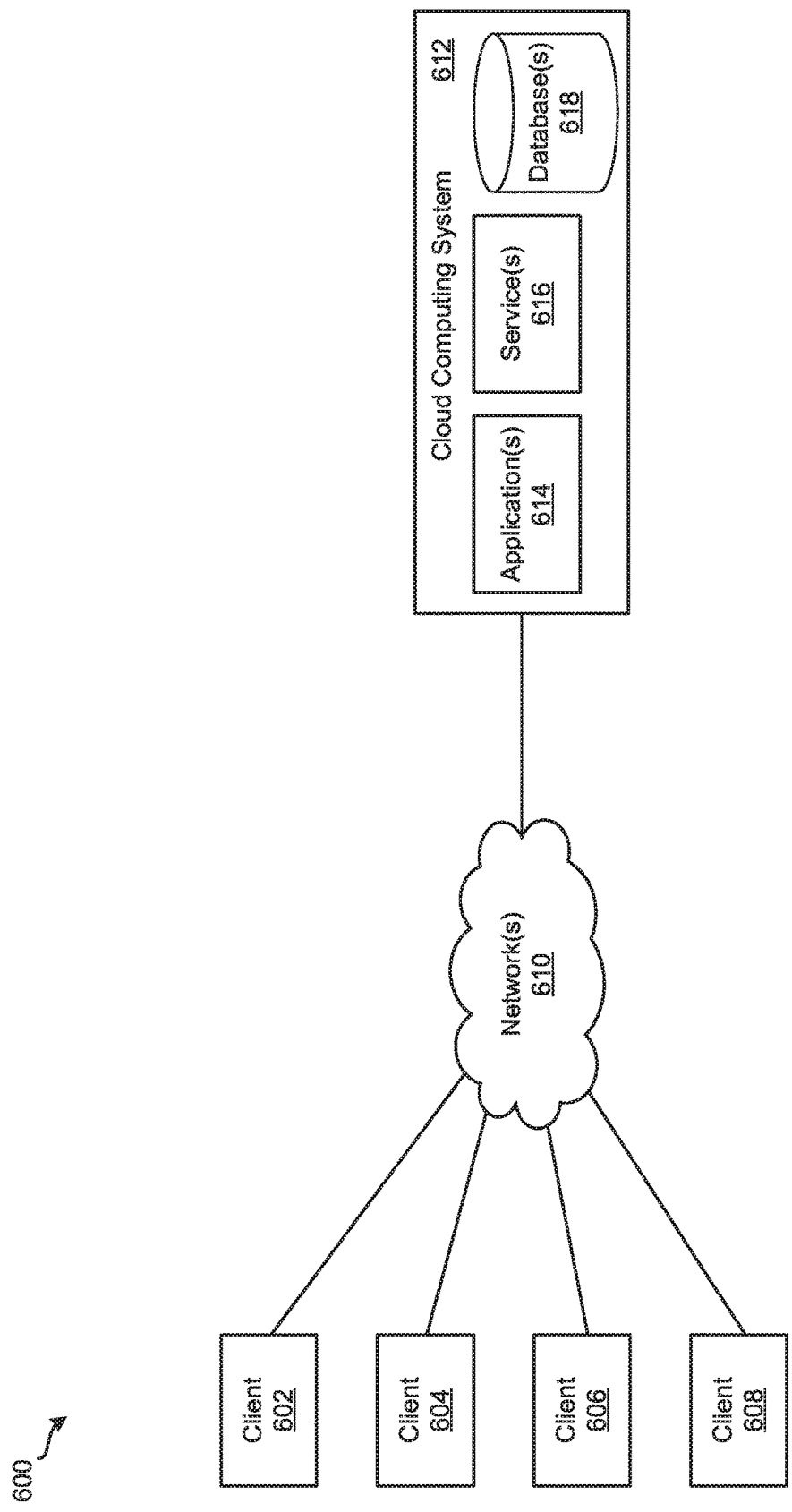
FIG. 6 illustrates an exemplary system, in which various embodiments may be implemented.

FIG. 6 illustrates an exemplary system 600 for implementing various embodiments described above. For example, one of client devices 602-608 may be used to implement client device 105 and cloud computing system 612 may be used to implement computing system 110. As shown, system 600 includes client devices 602-608, one or more networks 610, and cloud computing system 612. Cloud computing system 612 is configured to provide resources and data to client devices 602-608 via networks 610. In some embodiments, cloud computing system 600 provides resources to any number of different users (e.g., customers, tenants, organizations, etc.). Cloud computing system 612 may be implemented by one or more computer systems (e.g., servers), virtual machines operating on a computer system, or a combination thereof.

As shown, cloud computing system 612 includes one or more applications 614, one or more services 616, and one or more databases 618. Cloud computing system 600 may provide applications 614, services 616, and databases 618 to any number of different customers in a self-service, subscription-based, elastically scalable, reliable, highly available, and secure manner.

In some embodiments, cloud computing system 600 may be adapted to automatically provision, manage, and track a customer's subscriptions to services offered by cloud computing system 600. Cloud computing system 600 may provide cloud services via different deployment models. For example, cloud services may be provided under a public cloud model in which cloud computing system 600 is owned by an organization selling cloud services and the cloud services are made available to the general public or different industry enterprises. As another example, cloud services may be provided under a private cloud model in which cloud computing system 600 is operated solely for a single organization and may provide cloud services for one or more entities within the organization. The cloud services may also be provided under a community cloud model in which cloud computing system 600 and the cloud services provided by cloud computing system 600 are shared by several organizations in a related community. The cloud services may also be provided under a hybrid cloud model, which is a combination of two or more of the aforementioned different models.

In some instances, any one of applications 614, services 616, and databases 618 made available to client devices 602-608 via networks 610 from cloud computing system 600 is referred to as a "cloud service." Typically, servers and systems that make up cloud computing system 600 are different from the on-premises servers and systems of a customer. For example, cloud computing system 600 may host an application and a user of one of client devices 602-608 may order and use the application via networks 610.

Applications 614 may include software applications that are configured to execute on cloud computing system 612 (e.g., a computer system or a virtual machine operating on a computer system) and be accessed, controlled, managed, etc. via client devices 602-608. In some embodiments, applications 614 may include server applications and/or mid-tier applications (e.g., HTTP (hypertext transport protocol) server applications, FTP (file transfer protocol) server applications, CGI (common gateway interface) server applications, JAVA server applications, etc.). Services 616 are software components, modules, application, etc. that are configured to execute on cloud computing system 612 and provide functionalities to client devices 602-608 via networks 610. Services 616 may be web-based services or on-demand cloud services.

Databases 618 are configured to store and/or manage data that is accessed by applications 614, services 616, and/or client devices 602-608. For instance, inventory data storage 130 may be stored in databases 618. Databases 618 may reside on a non-transitory storage medium local to (and/or resident in) cloud computing system 612, in a storage-area network (SAN), on a non-transitory storage medium local located remotely from cloud computing system 612. In some embodiments, databases 618 may include relational databases that are managed by a relational database management system (RDBMS). Databases 618 may be a column-oriented databases, row-oriented databases, or a combination thereof. In some embodiments, some or all of databases 618 are in-memory databases. That is, in some such embodiments, data for databases 618 are stored and managed in memory (e.g., random access memory (RAM)).

Client devices 602-608 are configured to execute and operate a client application (e.g., a web browser, a proprietary client application, etc.) that communicates with applications 614, services 616, and/or databases 618 via networks 610. This way, client devices 602-608 may access the various functionalities provided by applications 614, services 616, and databases 618 while applications 614, services 616, and databases 618 are operating (e.g., hosted) on cloud computing system 600. Client devices 602-608 may be computer system 400 or computing device 500, as described above by reference to FIGS. 4 and 5, respectively. Although system 600 is shown with four client devices, any number of client devices may be supported.

Networks 610 may be any type of network configured to facilitate data communications among client devices 602-608 and cloud computing system 612 using any of a variety of network protocols. Networks 610 may be a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A non-transitory machine-readable medium storing a program executable by at least one processing unit of a device, the program comprising sets of instructions for:
   querying a set of databases to identify a first set of database schemas, each database schema in the first set of database schemas configured for a database in the set of databases;
   querying an inventory data storage for a second set of database schemas;
   comparing the first set of database schemas and the second set of database schemas; and
   based on the comparison, determining whether to deactivate database schemas in the set of databases, wherein determining whether to deactivate database schemas in the set of databases comprises, for each database schema in the first set of database schemas that is not included in the second set of database schemas:
      adding the database schema to the second set of database schemas stored in the inventory data storage; and
      preventing access to the database schema.

2. The non-transitory machine-readable medium of claim 1, wherein querying the set of databases comprises:
   querying each database in the set of databases;
   for each database in the set of databases, generating a list of errors, each error in the list of errors associated with a database schema configured for the database;
   merging the lists of errors into a single list of errors; and
   using the single list of errors as the first set of database schemas.

3. The non-transitory machine-readable medium of claim 1, wherein the program further comprises a set of instruction for reactivating each database schema in the second set of database schemas that is not included in the first set of database schemas.

4. The non-transitory machine-readable medium of claim 1, wherein the program further comprises sets of instructions for:
   receiving a request to create a database schema in a database in the set of databases, wherein the request includes a data source for the database schema;
   in response to the request, creating the database schemas in the database; and
   copying data from the data source into the database schema.

5. The non-transitory machine-readable medium of claim 1, wherein each database in the set of databases comprises a set of tables, wherein a database schema configured for a database in the set of databases includes a subset of the set of tables and specifies the relationships among the subset of the set of tables.

6. The non-transitory machine-readable medium of claim 1, wherein each database schema in the first set of database schemas has at least one error stored in a table included in the database schema.

7. A non-transitory machine-readable medium storing a program executable by at least one processing unit of a device, the program comprising sets of instructions for:
   querying a set of databases to identify a first set of database schemas, each database schema in the first set of database schemas configured for a database in the set of databases;
   querying an inventory data storage for a second set of database schemas;
   comparing the first set of database schemas and the second set of database schemas; and
   based on the comparison, determining whether to deactivate database schemas in the set of databases, wherein determining whether to deactivate database schemas in the set of databases comprises, for each database schema in the first set of database schemas that is not included in the second set of database schemas:
      adding the database schema to the second set of database schemas stored in the inventory data storage; and
      preventing access to the database schema.

8. The method of claim 7, wherein querying the set of databases comprises:
   querying each database in the set of databases;
   for each database in the set of databases, generating a list of errors, each error in the list of errors associated with a database schema configured for the database;
   merging the lists of errors into a single list of errors; and
   using the single list of errors as the first set of database schemas.

9. The method of claim 7 further comprising reactivating each database schema in the second set of database schemas that is not included in the first set of database schemas.

10. The method of claim 7 further comprising:
   receiving a request to create a database schema in a database in the set of databases, wherein the request includes a data source for the database schema;
   in response to the request, creating the database schemas in the database; and
   copying data from the data source into the database schema.

11. The method of claim 7, wherein each database in the set of databases comprises a set of tables, wherein a database schema configured for a database in the set of databases includes a subset of the set of tables and specifies the relationships among the subset of the set of tables.

12. The method of claim 7, wherein each database schema in the first set of database schemas has at least one error stored in a table included in the database schema.

13. A system comprising:
   a set of processing units; and
   a non-transitory machine-readable medium storing instructions that when executed by at least one processing unit in the set of processing units cause the at least one processing unit to:
      query a set of databases to identify a first set of database schemas, each database schema in the first set of database schemas configured for a database in the set of databases;
      query an inventory data storage for a second set of database schemas;
      compare the first set of database schemas and the second set of database schemas; and
      based on the comparison, determine whether to deactivate database schemas in the set of databases, wherein determining whether to deactivate database schemas in the set of databases comprises, for each database schema in the first set of database schemas that is not included in the second set of database schemas:
         adding the database schema to the second set of database schemas stored in the inventory data storage; and
         preventing access to the database schema.

14. The system of claim 13, wherein querying the set of databases comprises:
   querying each database in the set of databases;
   for each database in the set of databases, generating a list of errors, each error in the list of errors associated with a database schema configured for the database;
   merging the lists of errors into a single list of errors; and
   using the single list of errors as the first set of database schemas.

15. The system of claim 13, wherein the instructions further cause the at least one processing unit to reactivate each database schema in the second set of database schemas that is not included in the first set of database schemas.

16. The system of claim 13, wherein the instructions further cause the at least one processing unit to:
   receive a request to create a database schema in a database in the set of databases, wherein the request includes a data source for the database schema;
   in response to the request, create the database schemas in the database; and
   copy data from the data source into the database schema.

17. The system of claim 13, wherein each database in the set of databases comprises a set of tables, wherein a database schema configured for a database in the set of databases includes a subset of the set of tables and specifies the relationships among the subset of the set of tables.

* * * * *